United States Patent [19]
Kawamura

[11] Patent Number: 6,137,198
[45] Date of Patent: Oct. 24, 2000

[54] STATOR FOR A MAGNETO GENERATOR

[75] Inventor: Kouji Kawamura, Numazu, Japan

[73] Assignee: Kokusan Denki Co., Ltd., Shizuoka-Ken, Japan

[21] Appl. No.: 09/415,572

[22] Filed: Oct. 8, 1999

[30] Foreign Application Priority Data

May 12, 1997 [JP] Japan ......................................... 335622

[51] Int. Cl.[7] .................................................. H02K 11/00
[52] U.S. Cl. ............................ 310/71; 310/89; 439/276; 439/606
[58] Field of Search ................................. 310/71, 89, 91, 310/254; 439/276, 606; 29/592.1

[56] References Cited

U.S. PATENT DOCUMENTS

| | | | |
|---|---|---|---|
| 4,481,435 | 11/1984 | Loforese | 310/71 |
| 4,544,856 | 10/1985 | King | 310/71 |
| 4,616,149 | 10/1986 | Best | 310/71 |
| 4,941,850 | 7/1990 | Ankers et al. | 439/610 |
| 4,982,124 | 1/1991 | Cummings et al. | 310/71 |
| 5,000,695 | 3/1991 | Nishiyama et al. | 439/276 |
| 5,113,037 | 5/1992 | King, Jr. et al. | 174/87 |
| 5,175,458 | 12/1992 | Lemmer et al. | 310/71 |
| 5,204,566 | 4/1993 | Borgen et al. | 310/71 |
| 5,278,357 | 1/1994 | Yamanashi | 174/151 |
| 5,877,572 | 3/1999 | Michaels et al. | 310/179 |
| 6,030,260 | 2/2000 | Kikuchi et al. | 439/890 |

FOREIGN PATENT DOCUMENTS

| | | |
|---|---|---|
| 65871 | 5/1986 | Japan . |
| 3257 | 1/1995 | Japan . |

*Primary Examiner*—Nestor Ramirez
*Assistant Examiner*—Joseph Waks
*Attorney, Agent, or Firm*—Pearne & Gordon LLP

[57] ABSTRACT

A stator for a magneto generator comprises a stator core having an annular yoke and a plurality of radial salient poles, a generator coil having coil portions wound on the salient poles of the stator core and connected to each other and output cords having core conductors connected to lead wires led out of the generator coil. A holder formed of an insulating resin on the yoke of the stator core is provided with recesses which have bare connections of the lead wires and the output cords placed therein and are filled with adhesives so as to cover the connections in an electrically insulated manner and fix them to the holder.

3 Claims, 5 Drawing Sheets

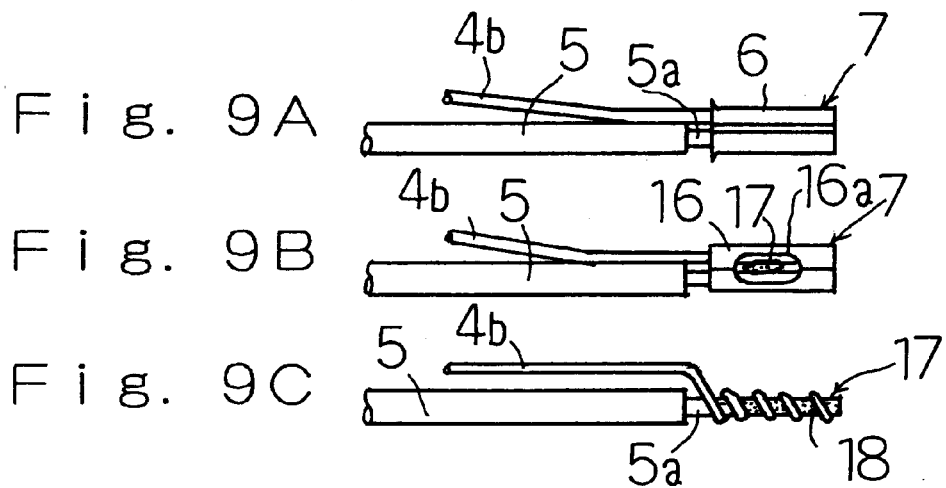
Fig. 9A
Fig. 9B
Fig. 9C
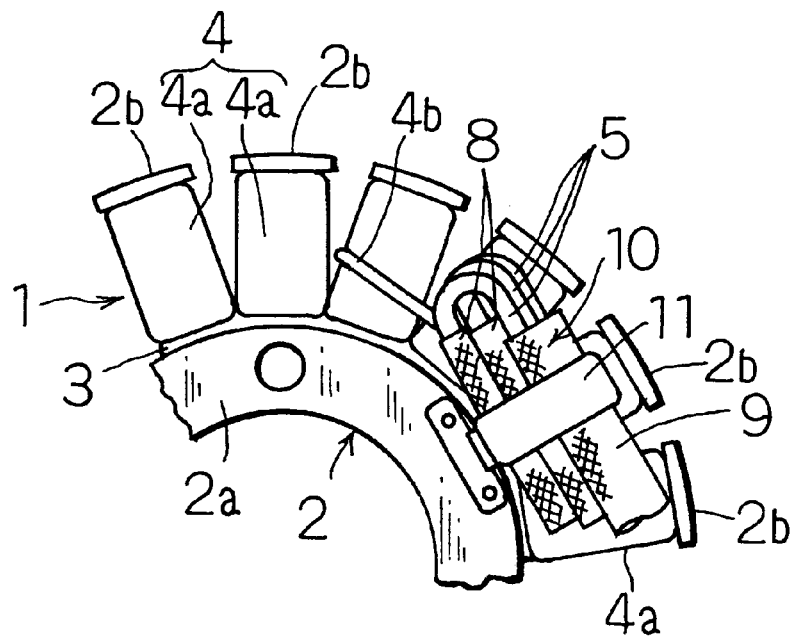
Fig. 10
Prior art

STATOR FOR A MAGNETO GENERATOR

TECHNICAL FIELD OF THE INVENTION

This invention pertains to a stator for a magneto generator suitably mounted on an internal combustion engine and more particularly to an arrangement in which connections of leads wires of a generator coil and output cords are securely provided on the stator core.

BACKGROUND OF THE INVENTION

A stator for a magneto generator comprises a stator core having a plurality of radial salient poles and a generator coil having coil portions wound on the salient poles of the stator core in an condition where they are electrically insulated from the stator core. A plurality of lead wires led out of the generator coil are connected to output cords, respectively.

There is shown in FIG. 10 a prior art stator 1 used for a multi-pole magneto generator, which is disclosed in JU61-65871(Japanese Utility Model Application Laying-Open No. 65871/1986). A stator core 2 includes an annular yoke 2a and a plurality of salient poles 2b radially extended from the periphery of the yoke 2a. A coating layer 3 of an insulating resin is formed on a peripheral edges of the yoke 2a of the stator core 2 and the salient poles 2b so as to cover them.

Coil portions 4a are wound on the salient poles 2b of the stator core 2, respectively and connected to each other through jumping wires to form a generator coil 4. A plurality of lead wires 4b are led out of the generator coil 4 and at their ends are connected to ends of output cords 5. In the illustrated embodiment, since the generator coil 4 has a three-phase star connection, the three lead wires 4b are led out of the generator coil 4.

The respective lead wires 4b and the respective output cords 5 are connected to each other by connection means such as a compression metal terminal 6 compressively deformed while the ends of the lead wires 4b and the output cords 5 extend through the terminal from the same direction. As shown in FIG. 12, the connections 7 of the lead wires 4b and the output cords 5 are inserted into a relatively shorter insulating tube 8 so as to be electrically insulated from the outside. The respective output cords 5 connected to the lead wires 4b are put together in a bundle and inserted into an insulating tube 9 to be led out as a wire harness 10.

As shown in FIG. 10, the output cords 5 adjacent to the insulating tubes 8 are folded so that the end of the wire harness 10 extends along the insulating tubes 8 which cover the connections of the lead wires 4b and the output cords 5 and the insulating tubes 8 and the end of the wire harness 10 disposed close to each other are put together and securely mounted on the yoke 2a of the stator core by a metal fastener 11 which serves to fasten them to the yoke 2a while the fastener 11 itself is fastened thereto.

There is shown in FIG. 11 another prior art stator for the magneto generator which is disclosed in JU7-3257(Japanese Utility Model Application Laying-Open No. 3257/1995). In this stator, the connections 7 of the lead wires 4b and the output cords 5 covered by the insulating tubes 8 is put together and tightened on one of the coil portions 4a by a resin thread (not shown) while the end of the wire harness 10 is securely mounted on the yoke 2a by the metal fastener 11 which itself is fastened to the yoke 2a.

With the prior art stators for the magneto generator as shown in FIGS. 10 and 11, the connections 7 of the lead wires 4b and the output cords 5 covered by the insulating tubes 8 are secured onto the generator coil 4. However, if the connections 7 of the lead wires 4b and the output cords 5 have a sharp projection or projections such as fin or flash, then the projections will contact the generator coil 4 due to the projections breaking through the insulating tubes 8, which disadvantageously causes the generator coil 4 to have a partial short circuit through the projections.

Furthermore, the prior art stators for the magneto generator sometimes have the connections 7 of the lead wires 4b and the output cords 5 not positively fastened, but floating within the insulating tubes 8. This causes the connections 7 to freely vibrate within the insulating tubes 8 as shown in FIG. 13 when exterior force such as vibration from an engine is applied thereto and therefore the lead wires 4b or the output cords 5 to be disconnected.

SUMMARY OF THE INVENTION

Accordingly, it is a principal object of the invention to provide a stator for a magneto generator adapted to effectively prevent lead wires or output cords from being disconnected or having a short circuit.

It is another object of the invention to provide a stator for a magneto generator adapted to electrically insulate lead wires or output cords in a simpler manner so that a number of steps and a cost for producing the stator can be reduced.

It is further object of the invention to provide a stator for a magneto generator adapted to more easily fasten connections of lead wires and output cords to the stator.

In accordance with the present invention, there is provided a stator for a magneto generator comprising a stator core having a plurality of radial salient poles provided on a periphery of an annular yoke, a generator coil having coil portions wound on the salient poles of the stator core, respectively, a plurality of output cords having core conductors at one ends connected to a plurality of lead wires led out of the generator coil and a holder of an insulating resin fastened to the yoke of the stator core, the holder being provided with recesses which have bare connections of the lead wires and the output cords placed therein and filled with adhesives so as to cover the connections in an electrically insulated manner and fix them to the holder.

With the holder of the insulating resin fastened to the annular face of the yoke, the connections of the lead wires and the output cords being placed with the recesses in the holder and the adhesives filled within the recesses so as to fix them to the stator core as aforementioned, since the connections never freely vibrate within the holder even though a vibration is applied to the connections of the lead wires and the output cords, the lead wires and the output cords are never disconnected.

With the connections of the lead wires and the output cords being fixed within the recesses in the holder which is in turn attached onto the yoke of the core, the sharp projections such as fins which are possibly produced on the connections never contact the generator coil so that a short circuit accident of the stator never occurs.

With such an aforementioned arrangement used in the stator, the connections of the lead wires and the output cords can be placed within the recesses while they are kept bare, which causes the treatment of electrically insulating the connections to be simplified. This reduces the steps by which the stator is produced and therefore the cost therefor.

The lead wires and the output cords may be preferably connected to each other while they extend along each other so that the leading ends thereof are placed in the same direction. The recesses in the holder may be preferably provided in a spaced manner along the periphery of the yoke of the stator core and opened toward the outwardly radial direction of the yoke and also toward an outer face of the holder opposite to the yoke.

With such an arrangement of the recesses used, the connections of the lead wires and the output cords can be more easily placed within the recesses in the holder and the adhesives can be more easily injected into the recesses through the opening of the recesses which is faced to the outer face of the holder. Thus, it will be noted that the connections of the lead wires and the output cords can be more easily fixed to the yoke.

BRIEF DESCRIPTION OF THE DRAWING

The above and other objects and features of the invention will be apparent from the description of the embodiments of the invention taken along with reference to the accompanying drawings in which;

FIG. 9A is a side elevational view of one of the connections of the lead wires of the generator coil and the output cords constructed in accordance with one example;

FIG. 9B is a side elevational view of one of the connections of the lead wires of the generator coil and the output cords constructed in accordance with another example;

FIG. 9C is a side elevational view of one of the connections of the lead wires of the generator coil and the output cords constructed in accordance with further example;

FIG. 10 is a front view of a main portion of one of prior art magneto generators;

DETAILED DESCRIPTION OF EMBODIMENTS OF THE INVENTION

Figure 1:
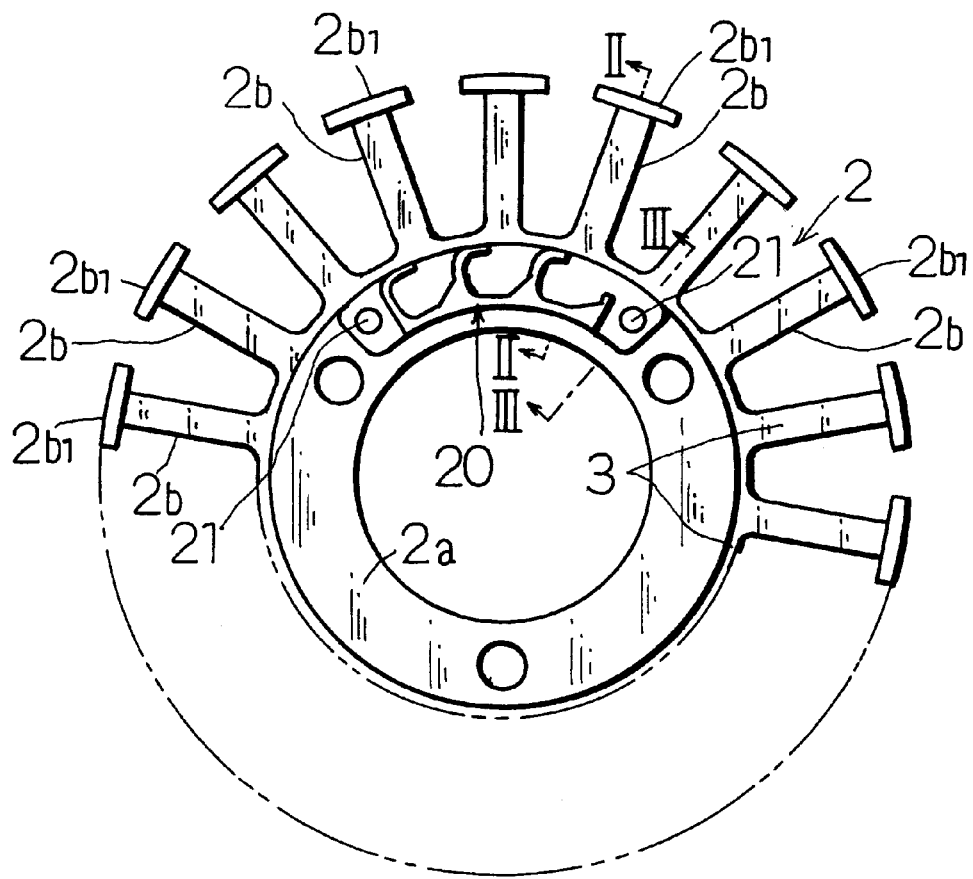
FIG. 1 is a front view of a stator core and a holder fastened onto the stator core which are used for the embodiment of the invention.
Figure 2:
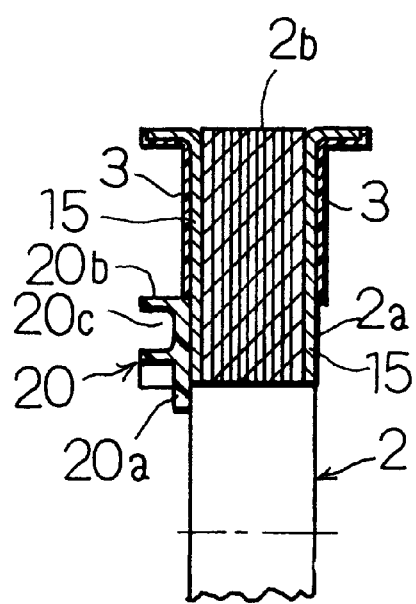
FIG. 2 is a cross sectional view of the components of FIG. 1 taken along the line II—II of FIG. 1.
Figure 3:
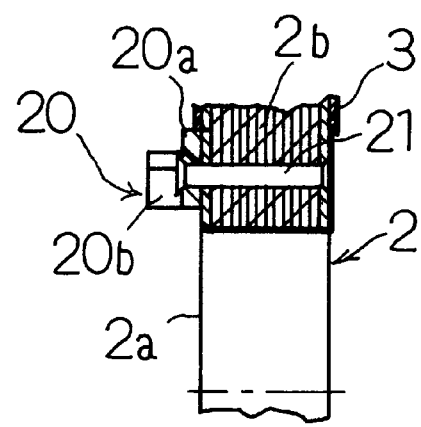
FIG. 3 is a cross sectional view of the components of FIG. 1 taken along the line III—III of FIG. 1.

FIGS. 1 through 3 show a stator core 2 and a holder 20 which are used for one embodiment of the invention. The stator core 2 shown in these figures has an annular yoke 2a and a plurality of radial salient poles 2b, 2b—provided on a periphery of the annular yoke 2a in a manner spaced at an equal angle along the periphery of the yoke 2b. In the illustrated embodiment, the stator core 2 is shown to have eighteen salient poles 2b. On a leading end of each of the salient poles 2b is formed a pole piece 2b1 which is faced through a given gap to a magnetic pole of a magnet rotor not shown and mounted on a rotary shaft of a prime mover such as an internal combustion engine or the like.

The stator core 2 may be formed of a laminate of steel plates punched to a predetermined shape and side plates 15 and 15 superposed on the outsides of the laminate, both of which are tightened by a tightening means such as rivets or the likes. A resin coating layer 3 may be formed on an outer face of each of the salient poles and on an outer face of each of the yoke 2a at the portion adjacent to the outer periphery thereof. The resin coating layer 3 may be formed by a powder coating process which is conducted by covering a previously heated predetermined portion of the core 2 with thermosetting resin powder which is in the semi-cured condition and then curing it.

Figure 4:
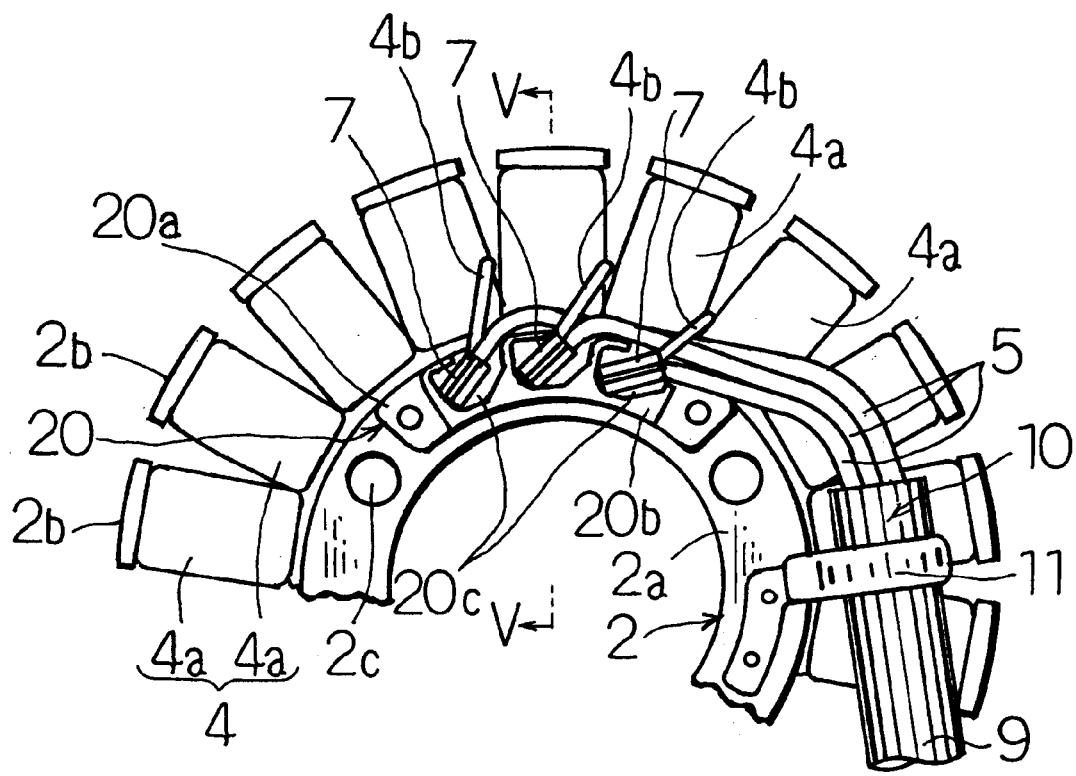
FIG. 4 is a front view of portions of the components of FIG. 1, but having connections of lead wires and output cords placed within recesses in the holder.
Figure 5:
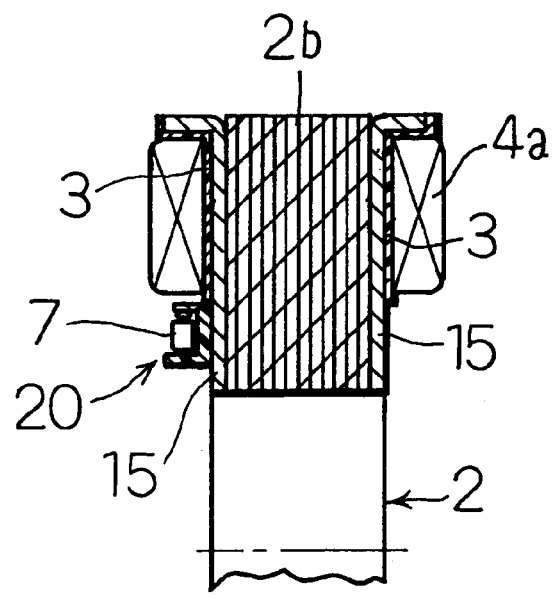
FIG. 5 is a cross sectional view of the components of FIG. 4 taken along the line V—V of FIG. 4.

As shown in FIG. 4, coils 4a, 4a—are wound on the salient poles 2b, 2b—of the stator core 2, respectively and are star-connected to each other to form a three-phase generator coil 4. Thus, three lead wires 4b are led out of the generator coil 4.

Figure 7:
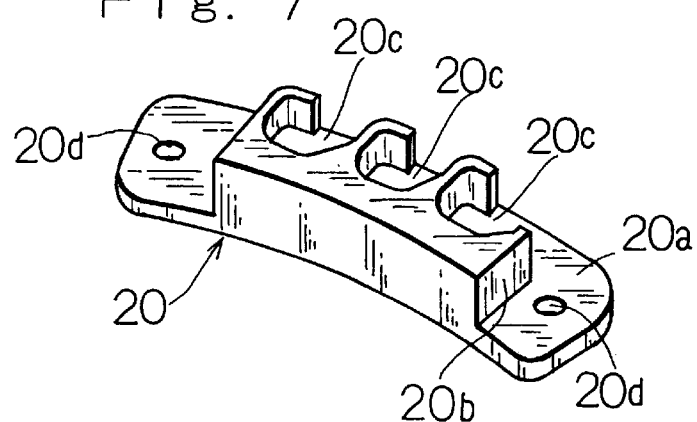
FIG. 7 is a perspective view of the holder used for the stator of the invention.

A holder 20 is securely mounted on the yoke 2a of the stator core 2. As shown in FIG. 7, the holder 20 includes a sheet-like base 20a having an arc of curvature equal to that of the annular yoke 2 so as to extend in a peripheral direction of the yoke 2a of the stator core 2 and a protrusion 20b integrally provided on one of the faces of the base 20a in a direction of thickness thereof. Fastening holes 20d and 20d may be provided in both ends of the base 20a. In the protrusion 20b are formed a plurality of recesses 20c to place connections of the generator coil 4 and the output cord therein in a manner spaced in the peripheral direction of the base 20a. In the illustrated embodiment, since the generator coil 4 has a star-connection and three lead wires 4b are led out thereof, three recesses 20c are shown to be provided in the protrusion 20b.

As shown in FIGS. 1 and 4, the holder 20 is disposed on the yoke 2a at axial one end thereof while the peripheral direction of the base 2a corresponds to the peripheral direction of the yoke 2a and while the protrusion 20b is positioned adjacent to the salient poles 2b on which the coil portions 4a from which the lead wires 4b extend are wound. The holder 20 may be fastened onto the yoke 2a by rivets 21 extending through the fastening holes 20d in the both ends of the base 20a. As shown in FIG. 1, the three recesses 20c in the holder 20 are provided so as to be opened in the outerwardly radial direction of the yoke 2a and also on the outer end face of the holder 20 which corresponds to the end face opposite to the base 20a. The recesses 20c on the end thereof facing the base 20a are closed by the base 20a.

Core conductors of three output cords 5 are connected to ends of the three lead wires 4b led out of the generator coil 4, respectively. The lead wires 4b and the output cords 5 are so disposed to extend along each other so that the leading ends thereof are placed in the same direction and the leading ends of the lead wires 4b and the core conductors 5a of the output cords 5 both of which the insulating layers are removed are electrically connected to each other. The three recesses 20c in the holder 20 correspond to the three lead wires 4b, respectively. Connections 7 of the lead wires 4b and the output cords 5 are placed within the corresponding recesses 20c in the holder 20 in the bare condition or without any insulation thereof.

Examples of connections 7 of the lead wires 4b and the core conductors 5a of the output cords 5 are shown in FIGS. 9A through 9C.

In an example of FIG. 9A, the leading ends of the lead wires 4b and the core conductors 5a of the output cords 5 are inserted into a compression metal terminal 6, which is inwardly and tightly compressed so as to electrically and physically connect the leading end of the lead wires 4b and the core conductors 5a of the output cords 5 to each other.

In an example of FIG. 9B, the leading ends of the lead wires 4b and the core conductors 5a of the output cords 5 are inserted into a compression metal terminal 16 having a window 16a provided therein, which is inwardly compressed and has solder 17 poured through the window 16a so as to electrically and physically connect the leading end of the lead wires 4b and the core conductors 5a of the output cords 5.

In an example of FIG. 9C, the leading ends 4b1 of the lead wires 4b are wound on the core conductors 5a of the output cords 5 in a coil-like manner and connected to the core conductors 5a of the output cords 5 by solder 18.

Figure 6:
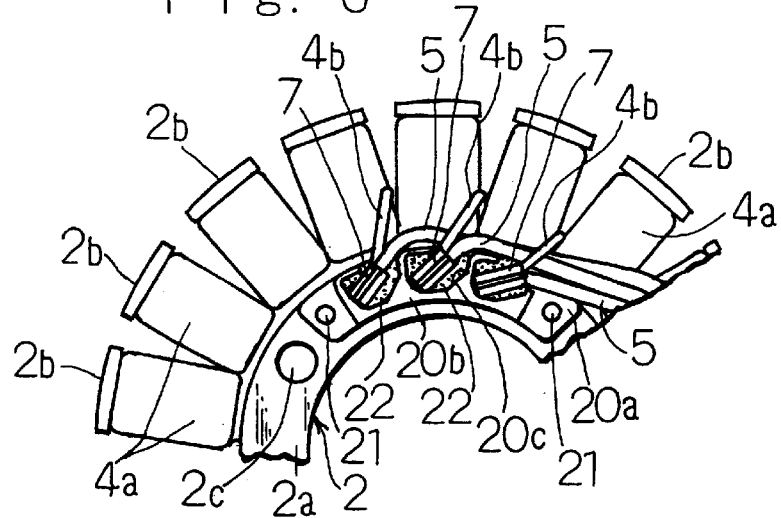
FIG. 6 is substantially similar to FIG. 4, but illustrates the holder to have adhesives injected into the recesses in the holder.

As shown in FIG. 4, after the connections 7 of the lead wires 4b and the output cords 5 are placed within the corresponding recesses 20c in the holder 20, adhesives 22 of a thermosetting insulating resin such as epoxy resin are filled within the recesses 20c as shown in FIG. 6. Thus, it will be noted that the connections 7 are fixed to the holder 20 in a manner electrically insulated and covered by the adhesives 22.

Figure 8:
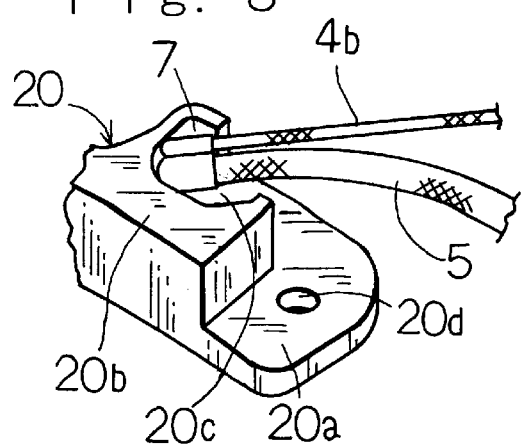
FIG. 8 is a perspective view of one of the connections of the lead wires and the output cords being placed within one of the recesses in the holder of FIG. 4.
Figure 11:
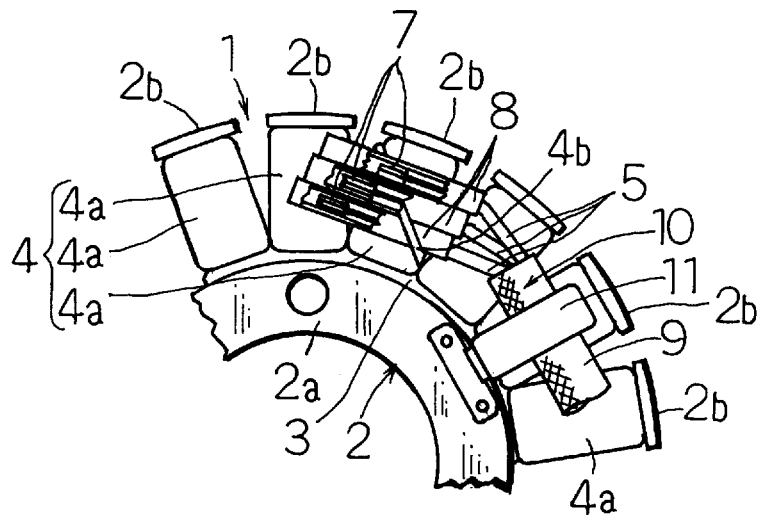
FIG. 11 is a front view of a main portion of another prior art magneto generator.
Figure 12:
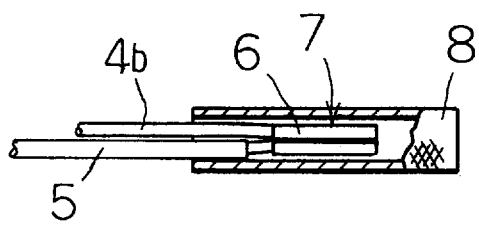
FIG. 12 is a cross sectional view of one of connections of lead wires and output cords which is used for the prior art magneto generators.
Figure 13:
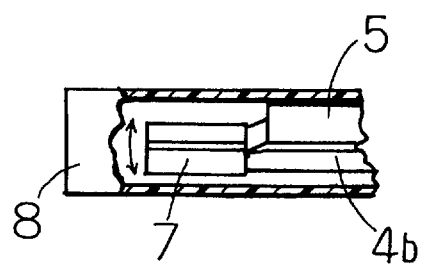
FIG. 13 illustrates a movement of the connections of the lead wires of the generator coil and the output cords in the prior art magneto generators when a vibration is applied thereto.

As shown in FIG. 8, in order to have the constant position of the connections 7 within the recesses 20c of the holder 20, the leading ends of the connections 7 may preferably abut against the inner face of the recesses 20c when they are inserted into the recesses 20c.

As shown in FIG. 4, the three output cords 5 to which the three lead wires 4b are connected, respectively are put together in a bundle and inserted into an insulating tube 9 so as to form a wire harness 10 which is formed of the output cords 5 and the insulating tube 9. The wire harness 10 at the beginning end thereof is tightened by a tightening device 11 which is in turn attached by rivets to the yoke 2a of the stator core 2.

With the holder 20 of the insulating resin fixed to the yoke 2a of the stator core 2, the connections 7 of the lead wires 4b and the core conductors 5a of the output cords 5 being placed within the recesses 20c in the holder 20 while they are kept bare and the adhesives 22 filled within the recesses 20c so as to fix them to the holder 20, the connections 7 never freely vibrate within the holder 20 even though a vibration is applied to the connections 7, the lead wires 4b and the core conductors 5a of the output cords 5 are never disconnected.

With the aforementioned arrangement used, the sharp projections such as the fins which may be possibly produced on the connections 7 are prevented from breaking the insulating layer of the coil portions 4a so that a short circuit accident of the generator coil due to the projections on the connections 7 never occurs.

With such an aforementioned arrangement used in the stator, since no insulating tube is required to be provided on the connections 7 of the lead wires 4b and the output cords 5, the steps by which the stator is produced and therefore the cost therefor can be reduced.

With the leading ends of the connections 7 abutting against the inner face of the recesses 20c when they are inserted into the recesses 20c as shown in FIG. 8, since the connections 7 can have the constant position within the recesses 20c of the holder 20, the position of the connections 7 of the lead wires 4b and the output cords 5 have no dispersion every product, which causes the property of the stator to be more improved.

With the recesses 20c in the holder 20 opened toward the outwardly radial direction of the yoke 2a and also toward the outer end face of the holder 20, the connections 7 of the lead wires 4b and the cords 5 can be more easily placed within the recesses 20c in the holder 20 and the adhesives 22 can be more easily injected into the recesses 20c. Thus, it will be noted that the stator can be more effectively assembled.

Although some preferred embodiments have been described and illustrated with reference to the accompanying drawings, it will be understood by those skilled in the art that they are by way of examples.

For instance, although, in the illustrated embodiments, the recesses 20c in the holder 20 are opened toward the outerwardly radial direction of the yoke 2a and also toward the outer end face of the holder 20, they may be opened only toward the outwardly radial direction of the yoke 2a or may be opened only toward the outer end face of the holder 20.

In case the recesses 20c are opened only toward the outwardly radial direction of the yoke 2a, they may be obliquely provided along the direction in which the connections 7 are inserted so that the connections 7 can be more easily inserted.

Although, in the illustrated embodiment, the resin coating layer 3 which covers the surfaces of the salient poles 2b and the yoke 2a at its portion adjacent to the periphery thereof is provided by the powder coating process, bobbins of an insulating resin may be provided on the stator core 2 and the coils may be wound on the bobbins.

Thus, it will be understood that various changes and modifications may be made without departing from the spirit and scope of the invention, which is defined only to the appended claims.

What is claimed is:

1. A stator for a magneto generator comprising a stator core having a plurality of radial salient poles provided on a periphery of an annular yoke, a generator coil having coil portions wound on said salient poles of said stator core, respectively, a plurality of output cords having core conductors, each of said core conductors being connected, at one end, to one of a plurality of lead wires led out of said generator coil, a holder of an insulating resin being fixed to said yoke of said stator core, said holder being provided with recesses, bare connections of the lead wires and the output cords being placed in said recesses and said recesses being filled with adhesives so as to cover said connections in an electrically insulated manner and fix them to said holder.

2. A stator for a magneto generator as set forth in claim 1 and wherein said lead wires and said output cords having leading ends and wherein said lead wires and said output cords extend along each other so that the leading ends of said lead wires and said output cords are placed in a common direction, said leading ends of said lead wires and said output cords are connected to each other and said recesses in said holder arranged in a manner spaced in a peripheral direction of said yoke and opened toward an outwardly radial direction of said yoke and also toward an outer end face of said yoke.

3. A stator for a magneto generator as set forth in claim 2 and wherein said connections of said lead wires and said output cords are fixed by said adhesives while leading ends of said connections abut against the inner face of said corresponding recesses.

* * * * *